Jan. 5, 1965 P. A. HARDING 3,164,810
MATRIX ACCESS ARRANGEMENT
Filed Jan. 9, 1961
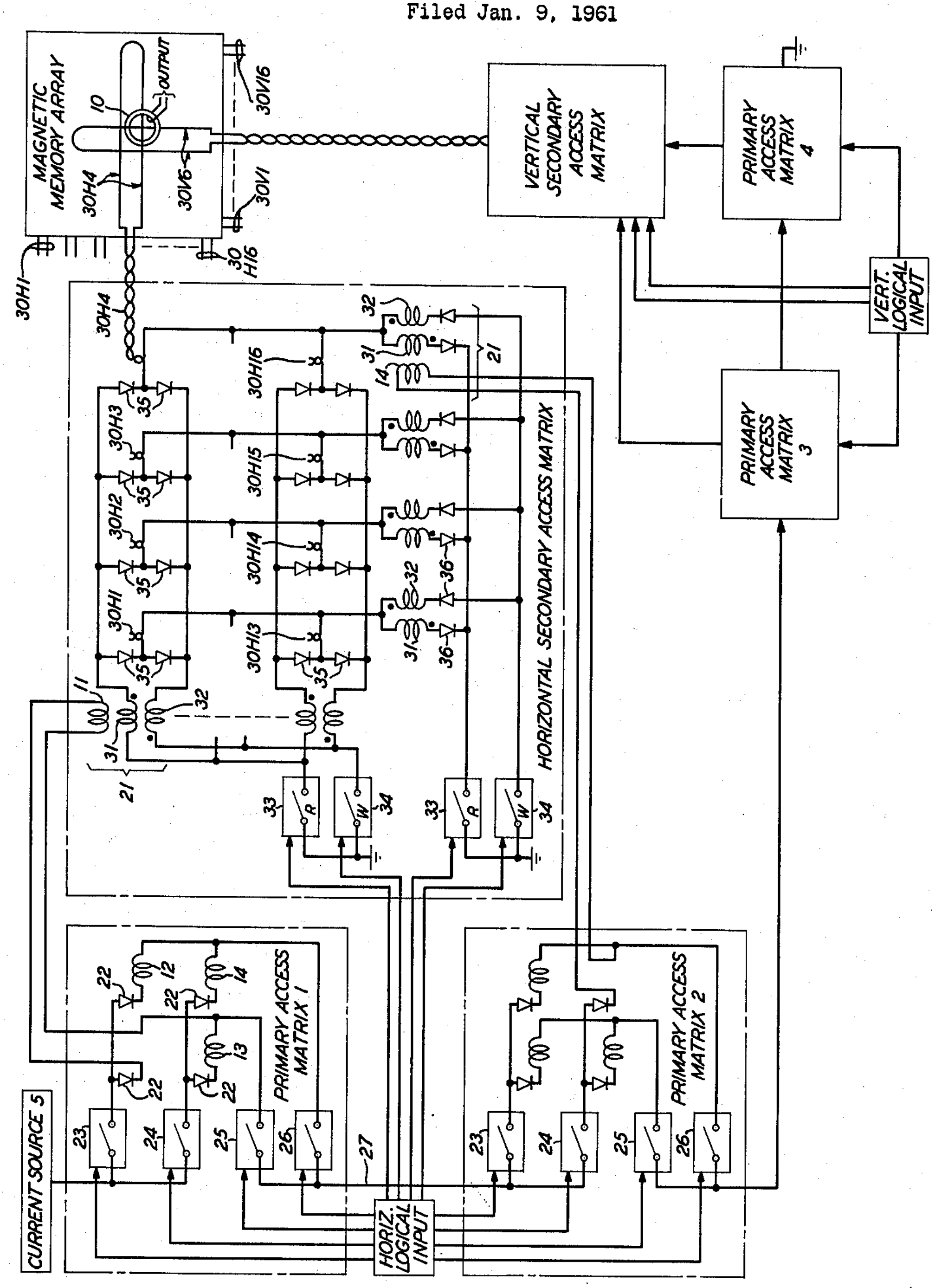
INVENTOR
P. A. HARDING
BY [signature]
ATTORNEY United States Patent Office 3,164,810
Patented Jan. 5, 1965

3,164,810
MATRIX ACCESS ARRANGEMENT

Philip A. Harding, Middletown, N.J., assignor to Bell Telephone Laboratories, Incorporated, New York, N.Y., a corporation of New York Filed Jan. 9, 1961, Ser. No. 81,433
7 Claims. (Cl. 340—174)

This invention relates to memory arrangements and more specifically to access circuitry for providing operational signals to such memory arrangements.

Magnetic memory arrays find extensive use in computer arrangements, in telephone switching systems, and in various other well-known fields of electrical endeavor. Generally, a magnetic memory array comprises a number of magnetic core elements of saturable material arranged in a coordinate form. Each of the magnetic core elements is normally provided with an input arrangement adapted to provide signals for placing the magnetic core in a first and in a second condition of saturation and an output arrangement adapted to sense any change in flux attendant on a change in the saturation condition of the magnetic core element. Many magnetic memory arrays utilize input arrangements adapted to accomplish the saturation conditions of individual magnetic cores by the application of coincident currents. In such an input arrangement the total current necessary for switching a magnetic core to a saturation condition is furnished by the coincident application via a number of input windings of a number of currents, the sum of which is equal to the requisite switching current. When such a coincident current system for furnishing input signals is utilized, the core elements may advantageously be arranged in the coordinate form with partial input signals being provided from individual input windings to a number of core elements whereby an economical utilization of input switching means is accomplished.

In coincident current memory matrices the uniformity of the coincident currents applied to obtain both conditions of saturation is essential. For example, in a single plane matrix, should one of the coincident currents applied to accomplish saturation be less than the necessary half-switching value, the selected core will not be switched. On the other hand, when one of the coincident currents is too great, other than selected cores connected to receive that current may be switched.

In addition, it has been determined that a magnetic core is never driven to what might be termed "absolute saturation," for the driving current necessary to obtain such a condition would be of an infinite value. For this reason, different currents applied to a magnetic core switch that core along slightly different hysteresis paths. If a first current is applied to drive a core to a first saturation condition and a second current of a different value is applied to drive the core to the opposite condition, then upon a subsequent reapplication, to the core, of either current the core is driven on a hysteresis path different from that on which it was driven when the current was initially applied. Since the output current which may be measured is directly related to the hysteresis path of the switching operation, output signals will vary unless substantially-identical currents are applied for switching the magnetic cores to both saturation conditions. When identical opposite-polarity currents are applied, maximum value, identical output signals may be realized.

It is therefore extremely desirable that the individual coincident currents utilized for accomplishing both saturation conditions of the cores of a magnetic memory array be substantially identical.

Heretofore various means of providing coincident drive currents have been suggested. For example, a number of memory arrangements utilize access circuitry, i.e., the switching circuitry for furnishing the coincidental inputs to the array, which includes multiple sources of input current. Since an access array must provide input currents in at least the horizontal and in the vertical directions to a memory matrix, at least two distinct sources of current are required if such an access array is to be of the multiple-source type. As a complicating factor, a substantial number of prior art access arrangements have primary and secondary stages of access switches whereby the number of actual switches utilized for furnishing horizontal and vertical input signals are minimized by providing coincident selection within the access arrangement. In such a case, each of the vertical and the horizontal access arrangements comprises a matrix unit to furnish inputs on both horizontal and vertical input conductors by some form of primary input arrangement. With at least four primary access arrangements, the use of multiple current sources requires that at least four distinct current sources be provided.

The use of multiple current inputs is undesirable for a number of reasons. Multiple current sources obviously require duplication of the circuitry for producing the original currents with an attendant increase in size and cost. Further, multiple current sources are generally infeasible for driving a coincident current array because of the aforementioned requirement of identical bipolar input signals. Such a requirement necessitates that the equipment utilized for furnishing the original currents from multiple sources and the equipment utilized for providing access to the memory array have extremely close tolerance characteristics. Equipment with such characteristics may well be too expensive for the normal use.

The most advantageous manner devised for providing coincident currents to drive a magnetic or other coincident memory array involves the use of a single current source and arrangements for delivering a multiplicity of individual currents from that single source. However, circuits heretofore disclosed which are adapted to provide multiple currents from a single source have been unable to provide substantially-identical currents from such a source because of the variance in characteristics between individual components of the access elements in an economically feasible arrangement. To provide substantially-identical currents, circuits of this type normally involve complication approaching that of circuits utilizing multiple input current sources. Additionally, individual ones of these single source circuits have been found impractical because of the extreme power requirements, and the cost attendant thereon, presented in driving the plurality of access arrangements necessary to provide input to the memory array.

It is therefore a primary object of this invention to provide identical bipolar currents for driving a coincident current memory array.

Another object of this invention is to utilize current from a single source for producing identical coincidental currents for driving the magnetic cores of a magnetic memory array to both saturation conditions.

An additional object of this invention is to reduce the complication of memory access switching arrangements and the cost attendant thereon.

Briefly, the foregoing objects are accomplished in accordance with aspects of this invention by an access arrangement including a plurality of primary access switching matrices arranged to serially utilize the unipolar current from a single source to provide identical input signals to both horizontal and vertical input terminals of first and second secondary access switching matrices. The secondary matrices are each adapted to convert the identical unipolar input signals to identical bipolar currents through selected secondary matrix crosspoints. The secondary matrix crosspoints are then connected to furnish identical bipolar driving currents on horizontal and vertical windings of a magnetic memory matrix.

The arrangement of primary matrices whereby one current source furnishes driving current in series to all of the secondary matrix input means provides that secondary input currents, though unipolar, are all identical. Thus, with all currents through the crosspoints of the secondary matrices converted by the secondary to identical bipolar coincident currents for driving the memory array, the core crosspoints in the memory will have hysteresis paths for both conditions of saturation which are substantially identical.

To accomplish the purpose of utilizing a current from a single source for driving all primary matrices, the primary matrix arrangements are adapted to be of a coincident selection type. In such an arrangement each horizontal path for selecting a primary matrix crosspoint is directly connected to each vertical path via a crosspoint for each vertical path. Each horizontal and each vertical path includes a switch, and the single source is directly connected to either all of the horizontal or to all of the vertical paths of a first matrix. By selectively closing one of the horizontal and one of the vertical switches in the first matrix, one of the current is furnished to a selected crosspoint therein and a current path is completed through the first matrix. The current input terminals of a next primary matrix are connected to the current output terminals of the preceding primary matrix in order to receive the current propagated through the first matrix. It is clear that a plurality of primary matrices may be driven by the same series current by the above-described operation.

To convert the unipolar current present in the primary matrices to the bipolar currents (i.e., read and write currents) necessary for driving the memory array to its opposite saturation conditions, the secondary matrices are each adapted to be of a coincident selection type in like manner to the primary matrices. Each of the secondary matrices comprises a number of horizontal and a number of vertical input arrangements. Each individual horizontal input arrangement is adapted to be operated in response to the selection of a predetermined crosspoint in a first primary matrix, and each vertical input arrangement is adapted to be operated in response to the selection of a predetermined crosspoint in a second primary matrix. Each of the horizontal and each of the vertical input arrangements includes first and second oppositely-wound secondary windings of a pulse transformer coupled in common to a primary winding thereof. Each of the primary windings comprises one of the crosspoints of the associated primary matrix. One of the two secondary windings of each input arrangement is connected in series between ground and predetermined crosspoints by a "read" switch while the other winding is connected between ground and the same crosspoints by a "write" switch. Both of the secondary windings in each horizontal arrangement are connected to one side of all of the crosspoints in a predetermined horizontal row of the secondary matrix while both of the secondary windings in each vertical arrangement are connected to the other side of all of the crosspoints in a predetermined vertical column.

Assuming a current through primary windings coupled to the secondary windings of one of the horizontal and one of the vertical arrangements of a secondary matrix, when both of the "write" switches are closed the current will be propagated in a first direction through the selected crosspoint. On the other hand, assuming the same input signals, when both "read" switches are closed current will be propagated in the opposite direction through the selected crosspoint. In each case, however, the currents are furnished from the same source and, though of opposite polarity, are identical in magnitude.

In effect, each of the secondary matrices comprises two matrices superimposed on common crosspoints one of the two matrices being adapted to provide current from a source through the crosspoints in a first direction, the other being adapted to provide current from the same source through the same crosspoints but in an opposite direction.

It is a feature of this invention that an access arrangement is provided with primary access matrices so associated as to serially propagate current from one source through the selected crosspoints of all primary matrices.

Another feature of this invention relates to the use of pulse transformers having a single primary winding and dual secondary windings for transforming a single unipolar current to identical bipolar read and write currents.

Another feature of this invention relates to the use of dual, oppositely-wound input windings receiving input from a single primary winding in combination with switching means for selecting the appropriate one of the dual windings whereby identical, opposite-polarity currents may be produced from a single unipolar source for providing input signals to a magnetic core memory array.

These and other objects and features of this invention will be better understood upon consideration of the following detailed description and the accompanying drawing in which the single figure is a combination schematic-block diagram illustrative of the access arrangement of this invention.

Referring now to the drawing, there is shown a memory arrangement including a magnetic memory array in block diagram form. The magnetic memory array may be of any type well-known in the art wherein saturable magnetic core elements are associated as crosspoinnts in a coordinate arrangement adapted to be operated by currents furnished via input windings provided thereon. In the magnetic memory array shown in the drawing numerous pairs of windings and cores are provided, of which only a single one of the saturable magnetic core elements 10 is shown. The core 10, as shown, has a pair of identical input windings 30, one a horizontal input winding designated 30H4 and one a vertical input winding designated 30V6, for providing coincidental input signals for switching the core 10 to opposite conditions of saturation. All of the horizontal input windings 30H1 through 30H16 to the magnetic memory array are connected by a twisted pair of conductors to a horizontal secondary access matrix, and each input winding is driven by a distinct crosspoint of the plurality of crosspoints thereof. In a similar manner each of the vertical input windings 30V1 through 30V16 is connected via a twisted pair of conductors to a vertical secondary access matrix and each is driven by a respective crosspoint thereof. Though only horizontal and vertical input windings are shown, it is obvious that were additional crosspoints desired, additional input windings (such as third dimensional windings for crosspoints in a third dimension) might be utilized to increase the information handling capabilities of the memory matrix.

The horizontal and vertical input signals to the magnetic memory array are provided from the crosspoints in the horizontal secondary access matrix and the vertical secondary access matrix, respectively. The secondary access arrangements are organized in matrix form, in like manner to the memory array, to reduce the number of distinct driving switches necessary for applying input signals to the horizontal and vertical crosspoint windings 30 of the magnetic memory array. Since the horizontal and vertical secondary access arrangements are in matrix form, they are adapted to receive horizontal and vertical input signals from individual primary access matrices thereby reducing the number of individual secondary matrix input switches. Each secondary access matrix is provided with a first primary access matrix for furnishing horizontal input signals and with a second primary access matrix for furnishing vertical input signals. For example, the horizontal secondary access matrix receives horizontal input signals from a primary access matrix 1 and vertical input signals from a primary access matrix 2.

The primary access matrices 1–4 are series component arranged so that all utilize series current from a single source 5. The foregoing is accomplished by providing that each selection of a crosspoint in a primary matrix closes a current path through that matrix, as will be explained hereafter, and through all primary matrices 1–4 in a series component connection in order that the selected current paths are arranged in series with the source 5. Thus identical currents are provided at the crosspoints of all primary matrices 1–4. The secondary access matrices are then arranged to convert the identical unipolar currents provided at each primary access crosspoint to identical bipolar currents which may be utilized for providing coincident read and write inputs to the magnetic memory array.

All of the primary access matrices 1–4 are identical, and all of the secondary access matrices are identical. For this reason only one of each will be discussed in detail in describing the circuit arrangement and the operation thereof.

Referring to primary access matrix 1, there are shown a number of primary windings 11–14 inductively coupled to windings 31 and 32 of a plurality of pulse transformers 21. For the sake of clarity the primary windings 12–14 are shown positioned within the primary access matrix 1 in the drawing while a single one of the primary windings 11 is shown positioned adjacent the secondary windings associated therewith in a pulse transformer 21. Although only primary winding 11 is shown positioned in inductive relationship with its associated secondary windings in the horizontal secondary access matrix, it is to be understood that each of the primary windings 12 through 14 of primary access matrix 1 will be positioned in like manner in inductive relationship with its associated secondary windings of a pulse transformer 21 in the horizontal secondary access matrix.

Each of the primary windings 11–14 forms with a diode 22 a crosspoint of the primary access matrix 1, the diodes 22 being provided to eliminate stray current paths in the matrix 1. Obviously, an additional number of crosspoints may be utilized in any of the primary matrices 1–4, but four crosspoints only are shown in the interest of clarity. The current source 5 is connected via first externally-controllable switch 23 to the crosspoints in a first row and via a second externally-controllable switch 24 to the crosspoints of a second row. The opposite sides of the crosspoints in a first column are connected to an externally-controllable switch 25 while the crosspoints of a second column are connected to an externally-controllable switch 26. The switches 23–26 may be of any type which may be controlled by external signals, such as saturable transistor switches. Logical input signals to control the operation of the switches 23–26 are furnished from a horizontal logical input source. The horizontal source may be of any type well-known in the art for providing signals for closing one of the switches 23 or 24 coincidentally with one of the switches 25 or 26. Upon the closing of a selected pair of switches 23–26 under the control of the horizontal input source, a direct current path is provided through the selected one of the crosspoint windings 11–14 of the primary matrix 1 for the current from the source 5.

The switches 25 and 26 are advantageously connected via a conductor 27 to the switches 23 and 24 of the primary access matrix 2. In like manner, the switches 25 and 26 of the primary access matrix 2 are connected to the input switches 23 and 24, not shown, of the primary access matrix 3, and the primary access matrix 3 is connected identically via primary access matrix 4 to ground. The horizontal logical input source provides input to control the switches 23–26 of both of the primary access matrices 1 and 2. Input to control the switches 23–26 of the primary access matrices 3 and 4 is provided by a vertical logical input source. It is obvious that the horizontal and vertical input sources may be combined in a single source of logical input signals or may be associated in some other arrangement depending on the specific use to be made of the memory arrangement. For example, the horizontal and vertical logical input sources might comprise a commercially available computer arrangement.

Assuming current is applied from the source 5, whether in constantly available or in pulse form, when predetermined ones of the switches 23–26 in each of the primary access matrices 1–4 are selected a series path is established from the current source 5 through the predetermined one of the crosspoint windings 11–14 in each matrix 1–4 to ground. For example, assuming the switches 23 and 25 of each primary matrix 1–4 have been closed, current from source 5 flows through the switch 23 of matrix 1, through the diode 22 and the primary winding 11 connected therewith, and through the switch 25. From the primary access matrix 1, the same current flows in series via the conductor 27 through the primary access matrix 2 and matrices 3 and 4 connected in series therewith, traversing the switches 23 and 25 and the selected primary windings 11 thereof. In this manner the same current flows in each of the selected primary windings 11 of all the primary access matrices 1–4. Thus the input signal furnished by each one of the primary access matrices 1–4 to the associated secondary access matrix is identical to the input signals furnished by all others of the primary access matrices 1–4 to other associated secondary access matrices.

However, it should be noted that in the circuit operation described thus far the current is unipolar through all of the primary windings 11–14. The secondary access matrices are therefore provided with arrangements for converting the fields caused by the unipolar primary currents to identical bipolar read and write currents which may be utilized for coincidental selection within the associated magnetic memory array.

The horizontal secondary access matrix, and the vertical secondary access matrix, each comprise a number of crosspoint elements 30H1–30H16 associated in a coordinate arrangement. The crosspoint elements 30 may comprise any well-known arrangement for providing operating signals to a memory array. For example, twisted pairs comprising a single conductor arranged to loop the associated core elements 10 as a winding in the memory array may be utilized, as shown in the drawing.

Each of the crosspoint windings 30H1–30H16, in the horizontal secondary access, is connected to a vertical and to a horizontal input arrangement within the access matrix. Each input arrangement includes a first secondary winding 31 and a second secondary winding 32 each of which are identical but are wound in opposite directions. The windings 31 and 32 are both coupled to one of the primary windings 11–14 of the associated one of the primary access matrices 1–4. Each winding 31 in a horizontal arrangement is connected to an externally-controllable "read" switch 33 to ground. Each winding 32 is in like manner connected to an externally-controllable "write" switch to ground. The read and write switches 33 and 34, which control the input arrangements to the horizontal secondary access matrix, are connected to the horizontal logical input source and are controlled thereby in like manner as are switches 23–26 of the primary matrices 1–4. A plurality of diodes 35 and 36 are individually associated with each of the crosspoints 30H1–30H16. Upon selection of any predetermined crosspoint, a path may be established in the secondary access matrix which includes the secondary windings 31 and 32 for controlling the polarity of current through the selected path, and also includes a diode 35 and a diode 36 for eliminating stray currents in the secondary matrices.

Assuming that appropriate pairs of switches 23–26 of each of the primary access matrices 1–4 have been operated so that current is conducted by one primary winding of the primary matrices 1–4, the current in each may be coupled to propagate currents in either a first or a second direction through the selected crosspoints of the secondary access matrices by proper selection of either read switches 33 or write switches 34. When it is desired to provide a current in a first or read direction through a crosspoint, the read switches 33 may be closed. In such a case current flows in a path including the vertical and horizontal read switches 33, the selected windings 31, a diode 35, a diode 36, and the associated selected twisted-pair winding 30 in the magnetic memory array. Thus a first polarity current is provided through a selected crosspoint winding 30 of each of the secondary matrices to furnish two input signals to the magnetic memory array. The two coincidental read currents provided from the horizontal and vertical secondary access matrices cooperate to switch the magnetic state of core 10.

With the same direction input currents from source 5 provided at the same selected primary windings of the primary access matrices 1 and 2 as discussed above, the closure of write switches 34 in the horizontal secondary access matrix provides that the current through a selected crosspoint is propagated via the secondary windings 32. Since the windings 32 are wound in an opposite direction to the windings 31, the current furnished the selected crosspoint winding 30 will be in an opposite direction to that provided by selection of the read switches 33. Thus the arrangement of this invention is adapted to provide identical opposite-polarity currents for saturation of the cores 10 in both first and second magnetic conditions.

For illustrative purposes, the read and write operations are hereinafter explained with respect to the specific magnetic core 10 shown in the drawing. For either the read or the write operation, selection of identical windings 11–14 at primary matrix crosspoints is accomplished. For example, to select the illustrated core 10 the switches 23 and 25 of primary access matrix 1, the switches 24 and 26 of the primary access matrix 2, and the switches 23 and 26 of each of the primary access matrices 3 and 4 are closed. The closure of these switches causes current flow through the primary winding 11 of the matrix 1, the primary winding 14 of the primary matrix 2, and the primary windings 12 (not shown) of the primary matrices 3 and 4.

Coincidentally with the selection of the above-identified switches of the primary matrices 1–4, the appropriate selection is made of either read or write switches in each of the secondary matrices. Assuming the write operation, for example, the switches 34 of the secondary matrices are closed. Referring to the horizontal secondary access matrix, it is clear that the closure of the switches 34 thereof, with current flowing through the primary winding 11 of the matrix 1 and the primary winding 14 of the matrix 2, provides current in a first direction through the winding 32 of the upper row, the winding 32 of the right-hand column, and the crosspoint twisted-pair 30H4 associated therewith. The provision of current in a first direction through the selected crosspoint 30H4 of the horizontal secondary matrix and, in like manner, through the selected crosspoint 30V6, of the vertical access matrix, furnishes the requisite coincident currents for saturating core 10 in the write condition.

On the other hand, with the same primary windings energized, the closure of the read switches 33 of each secondary access matrix causes an identical current to flow through the same windings 30H4 and 30V6 in the memory array, but in the opposite direction, as explained hereinbefore.

Thus, identical bipolar currents are furnished by the arrangement of the invention for providing coincidental operation of a magnetic memory matrix. Further, not only are the bipolar currents identical, but the coincidental currents, on the verical and horizontal windings 30 of the memory array, are furnished by the same source and are also substantially identical.

It will be noted that current flows in but a single direction through each of the switches 23–26, 33, and 34 of the invention. For this reason, simple, inexpensive switching means may be utilized. In addition, the complication of the access circuitry and the memory array is materially reduced by the application of both read and write signals via the same input windings to the memory array.

It is to be understood that the above-described arrangement is merely illustrative of an application of the principles of the invention. Numerous other arrangements may be devised by those skilled in the art without departing from the spirit and scope of the invention.

What is claimed is:

1. An access arrangement for providing logic signals for driving a coordinate memory array, said access arrangement comprising a pair of primary access coordinate switches, each of said primary switches of said pair having a plurality of primary windings of pulse transformers as primary crosspoint elements thereof; a single source of current; means for selectively connecting one of said primary windings from each of said primary access coordinate switches in a single series circuit including said single source of current; a secondary access matrix having column and row coordinate conductors and secondary crosspoint means connected thereto, said secondary crosspoint means being coupled to said coordinate memory array for furnishing signals to said array; first coupling means in said secondary matrix connected to said column conductors and second coupling means in said secondary matrix connected to said row conductors, said first and second coupling means being each inductively coupled to one of said primary windings in one of said primary switches of said pair; and grounding means connected to said first and second coupling means, said first and second coupling means when grounded being responsive to current flow from said single source through said single series circuit for providing bipolar currents through said secondary crosspoint means.

2. An access arrangement in accordance with claim 1 wherein said first and second coupling means include a plurality of pulse transformers each having first and second oppositely-wound secondary windings inductively coupled together and inductively coupled to one primary winding in said primary switches, first connecting means joining each of said first secondary windings in a common junction point and second connecting means joining each of said second secondary windings in a common junction point; said grounding means further including pairs of parallel connected switches having one switch of one pair connected in a ground return path to said first connecting means and the second switch of said one pair connected in a ground return path to said second connecting means, and means for coincidentally closing the switches of said pairs of switches connected to said first connecting means and for subsequently coincidentally closing the switches of said pairs of switches connected to said second connecting means.

3. An access arrangement for driving a coincident memory array which includes first and second pluralities of input terminals, said access arrangement comprising a plurality of secondary access matrices each having crosspoints coupled to one of said pluralities of input terminals of said memory array, each of said secondary matrices comprising a plurality of horizontal and a plurality of vertical input means connected to predetermined ones of said crosspoints, said input means each comprising oppositely-wound transformer secondary windings; a plurality of primary access matrices each having crosspoints comprising primary windings coupled to one of said input means of one of said secondary matrices, each of said primary matrices comprising a second plurality of horizontal and a second plurality of vertical input means, each of said second horizontal input means connected to one side of predetermined ones of said primary windings and each of said second vertical input means connected to the other side of predetermined ones of said primary windings; selecting means for activating one each of said second horizontal and vertical input means; a source of unidirectional current; and means arranging said plurality of primary matrices to utilize current from said unidirectional current source in series through all of the crosspoints defined by said selected second input means of all of said primary matrices.

4. An access arrangement for providing signals for driving a coincident logic arrangement, said access arrangement comprising a plurality of independent coordinate switches connected to said logic arrangement and each having a plurality of windings associated in coordinate arrangement for furnishing signals to said logic arrangement, a single source of current, means for selectively connecting said single source of current to one of said windings of one independent coordinate switch of said plurality of coordinate switches, and means for selectively connecting one of said windings from each of the remaining ones of said independent coordinate switches in series arrangement with said one winding and said source of current.

5. An access arrangement as in claim 4 wherein said means for selectively connecting one of said windings from each of the remaining ones of said independent coordinate switches in said series arrangement comprises a plurality of series circuits each including a first and a second switch means having one of said windings connected therebetween and means for closing said first and second switch means coincidentally in each of said coordinate switches.

6. An access arrangement for providing signals to a coincident logic circuit including a memory array driven by a horizontal and a vertical secondary access unit, said access arrangement comprising at least two pairs of matrices, each of said matrices of said pairs having a plurality of windings arranged as crosspoints of row and column conductors of said matrices, said windings of one pair of said matrix pairs being adapted to deliver signals to said horizontal secondary access unit and said windings of another pair of said matrix pairs being adapted to deliver signals to said vertical secondary access unit; a first plurality of switching means each connected to one of said row conductors of each of said matrices, and a second plurality of switching means each connected to one of said column conductors of each of said matrices; a source of current connected to all of said first plurality of switching means of one of said matrices; circuit means associating all the remaining ones of said matrices in component series arrangement with said one matrix, said circuit means having all of said second plurality of switches of all of said matrices connected to all of said first plurality of switches of a succeeding one of said matrices; and means for selectively closing one of said first and one of said second plurality of switching means of one of said matrices.

7. In a memory array driving circuit, the combination comprising a first plurality of coordinate switches each including a plurality of crosspoint means, first and second input means each including a first winding in series with a first switching means and a second oppositely-wound winding in series with a second switching means, and means including said crosspoint means and ground for connecting said winding and series switching means in shunt relation, a second plurality of coordinate switches arranged in pairs, each pair of said second plurality of switches being arranged with a plurality of primary winding crosspoints for providing a pair of signals to one of said first plurality of said switches, first and second means connected in series to said primary winding crosspoints, a source of current connected to all of said first means of one switch of said second plurality of coordinate switches and means connecting all of said second means of said one switch to all of said first means of a subsequent switch of said second plurality of coordinate switches whereby said second plurality of coordinate switches are arranged in a component series circuit, and means for controlling said first and second means in said second coordinate switches for completing a single series circuit current path therethrough, each of said primary windings in said second plurality of switches inductively coupled in common to both of said windings of one of said input means of one of said first plurality of coordinate switches, and means for controlling said first and second switching means in said first plurality of coordinate switches to complete a path through one of said crosspoint means of each of said first plurality of coordinate switches.

References Cited in the file of this patent

UNITED STATES PATENTS 2,988,732 Vinal ---------------- June 13, 1961